United States Patent
Fabing et al.

(10) Patent No.: US 9,925,834 B2
(45) Date of Patent: Mar. 27, 2018

(54) TIRE FOR DRIVING ON ICE

(71) Applicants: MICHELIN RECHERCHE ET TECHNIQUE S.A., Granges-Paccot (CH); COMPAGNIE GENERALE DES ETABLiSSEMENTS MICHELIN, Clermont-Ferrand (FR)

(72) Inventors: Daniel Fabing, Clermont-Ferrand (FR); Sebastien Fugier, Saint Bonnet Pres Riom (FR); Matthieu Durat, Clermont-Ferrand (FR); Cyril Guichon, Greer, SC (US); Claude Audebert, Les Martres sur Morge (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 372 days.

(21) Appl. No.: 14/682,728

(22) Filed: Apr. 9, 2015

(65) Prior Publication Data
US 2015/0283862 A1    Oct. 8, 2015

Related U.S. Application Data (63) Continuation of application No. 12/996,288, filed as application No. PCT/EP2009/056483 on May 27, 2009, now Pat. No. 9,022,085.

(30) Foreign Application Priority Data

Jun. 3, 2008 (FR) ..................... 08 53663

(51) Int. Cl.
  *B60C 11/16*  (2006.01)
  *B60C 11/12*  (2006.01)
  (Continued)

(52) U.S. Cl.
  CPC .......... *B60C 11/1625* (2013.01); *B60C 11/03* (2013.01); *B60C 11/0323* (2013.01);
  (Continued)

(58) Field of Classification Search
  CPC .. B60C 11/16; B60C 11/1625; B60C 11/1675
  See application file for complete search history.

(56) References Cited

U.S. PATENT DOCUMENTS

| | | |
|---|---|---|
| 3,757,841 A | 9/1973 | Cantz |
| 3,805,866 A | 4/1974 | Hohnsel |
| 4,676,290 A | 6/1987 | Tansei et al. |
| 5,634,994 A | 6/1997 | Teeri |

(Continued)

FOREIGN PATENT DOCUMENTS

| | | |
|---|---|---|
| DE | 102 58 812 | 7/2004 |
| FR | 1 403 818 | 11/1965 |

(Continued)

OTHER PUBLICATIONS

English machine translation of JP2003-267004, dated Sep. 2003.*

*Primary Examiner* — Robert C Dye
(74) *Attorney, Agent, or Firm* — Cozen O'Connor (57) ABSTRACT

A tire (10) for driving on ice, comprising: a tread (20) having a rolling surface with a groove, a stud (30) with a part (31) thereof projecting from the rolling surface and having a minimum cross section Sm; a conduit (200-205) that forms, on the rolling surface of the tire, two opposing edges (211, 221; 212, 222; 213, 223), the conduit opening into the groove and/or onto a lateral face of the tread; wherein, for each stud, the sum of the mean cross sections Sn of the conduits, each mean cross section Sn being measured at right angles to one of the opposing edges formed by the conduit, is greater than or equal to half the minimum cross section Sm of that part of the stud that projects from the tread.

16 Claims, 9 Drawing Sheets

Related U.S. Application Data

(60) Provisional application No. 61/190,541, filed on Aug. 29, 2008.

(51) Int. Cl.
    *B60C 11/03*        (2006.01)
    *B60C 11/13*        (2006.01)

(52) U.S. Cl.
    CPC .......... *B60C 11/12* (2013.01); *B60C 11/1281* (2013.01); *B60C 11/1376* (2013.01); *B60C 11/16* (2013.01)

(56) References Cited

U.S. PATENT DOCUMENTS

| | | |
|---|---|---|
| 6,374,886 B1 | 4/2002 | Eromaki |
| 6,533,006 B1 | 3/2003 | Siltanen |
| 2004/0231775 A1 | 11/2004 | Eromaki |
| 2006/0016536 A1* | 1/2006 | Maxwell ................ B60C 11/11 152/209.18 |
| 2006/0032566 A1* | 2/2006 | Koya ..................... B60C 11/11 152/209.18 |
| 2007/0062623 A1 | 3/2007 | Chassagnon et al. |

FOREIGN PATENT DOCUMENTS

| | | |
|---|---|---|
| FR | 2 182 750 | 12/1973 |
| JP | 4-197809 | 7/1992 |
| JP | 63-184508 | 7/1998 |
| JP | 2003-154527 | 5/2003 |
| JP | 2003-3267004 | 9/2003 |
| WO | WO 02/070287 | 9/2002 |

\* cited by examiner

FIG. 34
SECTION ON B-B

FIG. 35
SECTION ON C-C

TIRE FOR DRIVING ON ICE

RELATED APPLICATIONS

This application is a continuation of U.S. application Ser. No. 12/996,288 filed Mar. 22, 2011 which claims the priority under 35 USC § 371 of International application No. PCT/EP2009/056483, filed May 27, 2009. Priority is also claimed of French application no. 08/53663 filed Jun. 3, 2008, and U.S. Provisional application Ser. No. 61/190,541 filed May 5, 2008, the entire contents of all of which are hereby incorporated by reference.

FIELD OF THE INVENTION

The present invention relates to studded tires for driving on ice.

BACKGROUND OF THE INVENTION

Studded tires have undeniable advantages in terms of how they behave under winter driving conditions, such as driving on icy road surfaces for example. Contact with the ice, and more particularly the fact that the studs dig into the ice, compensates for the loss of grip displayed by the tire tread pattern elements: the studs scrape the ice and generate additional forces on the ice.

One of the difficulties in using studded tires is that the grip reaches its upper limit at values lower than might be expected with studs present.

SUMMARY OF THE INVENTION

The applicants have discovered that this reaching of an upper limit is in part due to the presence of ice splinters which originate when a stud scrapes the ice: if too great a quantity of splinters build up in the area of contact between the tire tread and the ice, the studs have less contact with the ice and lose some of their effectiveness.

One of the objectives of the present invention is to improve the grip of a studded tire for driving on ice.

This objective is achieved by a tire for driving on ice, comprising:

a tread having a rolling surface configured to come into contact with the ground when the tire is rolling along, this tread comprising at least one groove in the rolling surface;

at least one stud having a longitudinal axis, a part of the stud projecting from the rolling surface, the intersection between the stud and the plane tangential to the portion of the rolling surface around the stud forming a contour C, that part of the stud that projects from the rolling surface having a minimum cross section Sm, Sm corresponding to the smallest cross section of the said part in any plane containing the radial direction that passes through the point of intersection between the longitudinal axis of the stud and the plane tangential to the portion of the rolling surface around the stud;

at least one conduit that forms, on the rolling surface of the tire, at least two opposing edges, the minimum distance D between the conduit and the contour C being less than or equal to 1 cm, and preferably less than or equal to 0.5 cm, the conduit opening into the groove and/or onto a lateral face of the tread.

For each stud, the sum of the mean cross sections Sn of the conduits, each mean cross section Sn being measured at right angles to one of the opposing edges formed by the conduit, is greater than or equal to half the minimum cross section Sm of that part of the stud that projects from the tread. In more mathematical terms, this can be expressed as follows:

$$\sum_{n=1}^{N} Sn \geq \frac{1}{2} Sm. \quad (1)$$

One embodiment of the invention comprises adding conduits to the tread pattern near the studs in order to remove more quickly any splinters or lumps of ice generated during scraping. This faster removal allows to reduce the thickness of the interface between the rolling surface and the surface of the ice. This reduction in the interface thickness also increases the effective protrusion (or depth to which the ice is scraped) and results in a greater force of anchorage in the ice and allows an appreciable improvement in performance in terms of grip on ice.

Removal of the splinters is particularly effective when the geometric condition (1) is satisfied. When the sum of the cross sections Sn of the conduits is less than half the minimum cross section Sm, the conduit or conduits are unable to remove all the splinters quickly enough to improve the grip of the tire on the ice by comparison with tires that do not have conduits.

As a preference, the minimum distance between the conduit and the contour C of the stud is less than or equal to 0.5 cm, and even more preferentially less than or equal to 0.2 cm. This close proximity of the conduit to the stud which generates the ice splinters allows the removal of the ice splinters to be optimized.

More preferably still, the conduit connects the contour C to the groove.

According to one advantageous embodiment, the edges of the conduit are straight, allowing the splinters to be removed more quickly, as the splinters do not encounter any obstacles.

According to another advantageous embodiment, the edges of the conduit are curved. Thus, it is possible to generate transverse edges thereby improving other performance aspects such as, for example, the way in which the tire behaves on snow.

According to one advantageous embodiment, the conduit opens into a single groove of the tread. This embodiment makes it possible to have a smaller conduit and therefore to limit the amount of cuts in the rolling surface (groove ratio). It also makes it possible to reduce the impact of the conduits on the retention of the stud and therefore to increase the pull-out resistance of the stud and the life of the studded tire.

According to another advantageous embodiment, the conduit opens into at least two grooves of the tread. This embodiment has the advantage that the removal of ice splinters can continue even when there is an object obstructing one of the openings of the conduit into the groove. In addition, this embodiment offers a good compromise between the impact that the conduits have on stud retention and the effectiveness of the conduits.

The cross section of the conduit may be constant over the entire length of the conduit, or may vary along its length. In the latter instance it is preferable to ensure that the cross section of the conduit is at its minimum near the stud and increases towards the point or points at which the conduit opens into the groove. This then makes the conduits more effective, possibly associated with the Venturi effect.

According to one advantageous embodiment, the tire has a preferred direction of rolling, and the conduit is positioned in such a way that it comes into contact with the ground before the stud when the tire is rolling in its preferred direction of rolling. This embodiment allows good removal of the splinters generated when the tire is rolling in its preferred direction of rolling. It improves the effectiveness of the stud in terms of drive, through the presence of the conduit, while at the same time achieving good handling under braking. What happens is that under braking, the stud pivots, or tips over, into a position to minimize the forces acting upon it. In this position, it no longer generates ice splinters (any skidding of modern vehicles being very small on account of electronic assistance systems such as ABS) and the tread block can develop its full grip potential without being impeded by the stud.

According to an alternative embodiment, the tire has a preferred direction of rolling, and the conduit is positioned in such a way that it comes into contact with the ground after the stud when the tire is rolling in its preferred direction of rolling. This embodiment provides better braking when there is a great deal of skidding, that is to say on a vehicle that has no electronic assistance system of the ABS type. The improvements in drive are not, however, very great.

As a preference, the tread of the tire comprises a plurality of tread blocks, each tread block comprising a plurality of conduits. Thus, the effect obtained by one conduit can be amplified and obtained over a full revolution of the wheel. This embodiment also makes it possible to lessen the impact that the conduits have on stud retention.

It is then preferable to provide for each tread block to comprise at least two conduits of which the directions of greatest length along the rolling surface are not parallel (that is to say are inclined with respect to one another). This embodiment improves the effectiveness of the conduits under stresses of different kinds. For example, if one of the conduits is axially aligned, it is highly effective under axial stress (when driving round a bend or on a banked road), the second conduit has a direction of greatest length inclined with respect to the axial direction and therefore displays a certain effectiveness under circumferential stress. As a consequence, the tire has good axial and circumferential grip.

According to one advantageous embodiment, the conduit is extended radially inwards by a sipe. Thus, when wear has worn away the conduit in the tread block 40, there remains a sipe which performs its function known per se. Thus the conduits can be made to last a little longer with respect to tread wear.

According to an advantageous variant, the channel being dimensioned such that when the tread is worn and the channel opens onto the rolling surface, the channel forms a conduit in the rolling surface. This allows the effect obtained by the tire according to the invention to last ven longer. It is therefore possible to make the conduits last longer and maintain their effectiveness with respect to tread wear

DETAILED DESCRIPTION OF THE DRAWINGS

The term "tire" here denotes any type of elastic tire whether or not in service it is subjected to an internal inflation pressure.

The term "groove" designates a cut-out in the tire tread that opens onto the rolling surface and the function of which is to evacuate water that has accumulated between the tire and the surface on which the tire rolls. Grooves may be circumferential or transverse. Typically, in a passenger car tire, they have a width of between 2 and 10 mm and a depth of about 8 mm. Grooves are distinguished from sipes in that sipes are much narrower (typically 0.3 to 1.5 mm) than grooves.

The term "stud" as used in this document is synonymous with the term "spike" also used in the prior art.

The term "conduit" here denotes a recess made in the rolling surface, the mean radial depth of which is greater than or equal to 1 mm. A "conduit" forms at least two edges on the rolling surface. Its mean width, measured at right angles to these edges, s greater than or equal to 2 mm. The mean depth of the conduit is preferably less than the mean depth of a groove. Otherwise, anchoring problems may arise.

The conduits of a tire according to the invention form at least two opposing edges. For certain geometries, it is not easy to discern the point of separation between the two edges. This is particularly the case when the conduit has a rounded end near the contour C. In this case, the point on the edge closest to the contour C is chosen as the point of separation between the two edges.

The term "channel" here denotes a cavity in the tread which does not open onto the rolling surface (when the tire is new) but which does open into at least one groove of the tread or into a lateral face of the tread.

The "longitudinal axis" of a stud corresponds to the axis of symmetry of the stud in the direction of its longest dimension that passes through the surface of the stud configured to be in contact with the ground when the stud is fitted to a tire and the tire is rolling along the ground, if the stud has such an axis of symmetry. In a stud with no such axis of symmetry, the "longitudinal axis" denotes the direction of the longest dimension of the stud that passes through the surface of the stud configured to be in contact with the ground when the stud is fitted to a tire and the tire is rolling along the ground.

The "head" of a stud here means that end of the stud which anchors the stud in the tread of a tire. The head has a mean diameter greater than the mean diameter of the body of the stud, these diameters being measured in a direction at right angles to the longitudinal axis of the stud. The transition between the body of the stud and the head is usually via a part whose diameter is smaller than the diameters of the head and of the body.

The "rolling surface" here means all of those points of the tread that come into contact with the ground when the tire is rolling along without the studs being inserted into the tread.

The "lateral face" of the tread here means any part of the surface of the tread which extends from the axial ends of the rolling surface to the sidewalls of the tire.

When it is said that a conduit of a tire according to the invention "opens onto a groove and/or onto a lateral face of the tread", that means that the conduit may open onto a groove of the tread alone, or onto a lateral face of the tread alone, or onto both at the same time.

The expression "rubber mix" denotes a rubber composition containing at least one elastomer and one filler.

The expression "tread block" denotes a part of the tread made of vulcanized rubber mix and delimited by grooves.

When it is said that a part of a stud "projects" from the rolling surface, this should be understood as meaning that this part protrudes from the rolling surface at least when there is no contact with the ground.

The "portion of the rolling surface around the stud" here means a portion of the rolling surface in proximity to the stud. If the stud projects from a tread block, then it is taken to mean that portion of the rolling surface that corresponds to this tread block; otherwise, it is taken to mean a portion of the rolling surface that surrounds the stud up to a distance of 1 cm from the contour C of the stud.

A "radial" direction here is a direction corresponding to a radius of the tire. A radial direction is therefore a direction at right angles to the axis of rotation of the tire. It is in this sense that a point P1 is said to be "radially inside" a point P2 (or "radially on the inside of" the point P2) if it is closer to the axis of rotation of the tire than is point P2. Conversely, a point P3 is said to be "radially outside" a point P4 (or "radially on the outside of" the point P4) if it is further away from the axis of rotation of the tire than is point P4. Progress will be said to be "radially inwards (or outwards)" when it is in the direction of smaller (or larger) radii. When radial distances or depths are being discussed, it is this sense of the word that also applies.

An "axial" direction is a direction parallel to the axis of rotation of the tire.

A direction which is both normal to a radial direction and normal to the axial direction is denoted a "circumferential" direction.

A groove is said to be "transverse" when it has at least one axial component, that is to say when it is inclined with respect to a circumferential groove.

The term "sipe" here denotes a very narrow incision, typically between 0.3 and 1.5 mm wide, as compared with a groove whose width generally exceeds 2 mm.

The "minimum distance D between the conduit and the contour C" means the minimum distance between the edge of the conduit closest to the contour C, and this contour C.

The "preferred direction of rolling" of a tire means the direction of rolling recommended by the tire manufacturer, often indicated on the sidewall of the tire by means of an arrow. When fitting the tire to a vehicle, the tire should be fitted in such a way that the preferred direction of rolling of the tire corresponds to the direction in which the tire will roll as the vehicle travels forward.

Figure 1:
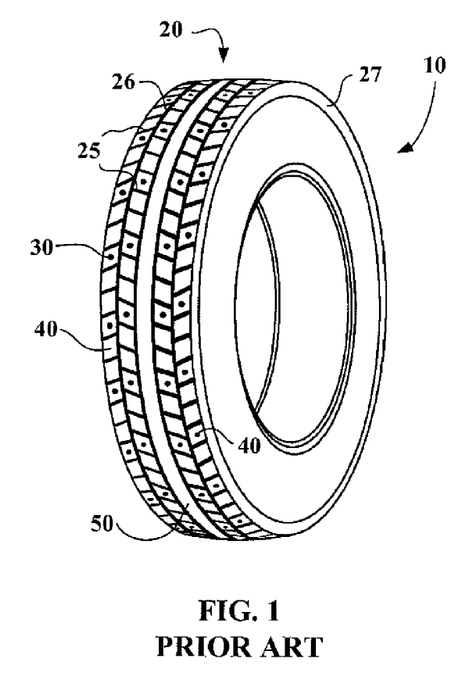
FIG. 1 depicts a studded tire according to the prior art.

FIG. 1 schematically depicts a tire 10 according to the prior art, comprising a tread 20 having a rolling surface configured to come into contact with the ground when the tire is rolling along. The tread 20 comprises a plurality of transverse 25 and circumferential 26 grooves and a plurality of studs 30. The studs 30 are positioned across the entire width of the rolling surface in tread blocks 40 of the tread 20. The central bar 50 of the tread may also have studs 30. The studs 30 are arranged in several positions around the periphery of the tire so that studs are at all times in contact with the ground on which the tire is rolling.

Figure 2:
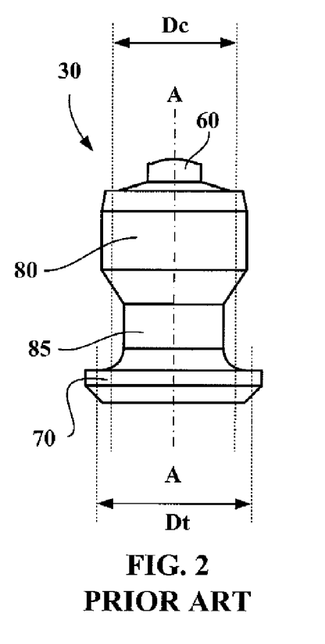
FIG. 2 depicts a stud according to the prior art.

FIG. 2 schematically depicts a stud 30 according to the prior art. The stud 30 has a longitudinal axis A-A. The profile of the stud 30 is generally cylindrical and centred on the axis A-A. The stud 30 has two axial ends: one of the axial ends defines a first part, here embodied by an "insert" 60, configured to come into contact with the ground (the ice, the snow or the bare surface) when the stud 30 is fitted to the tire 10 and the tire 10 is rolling along the ground. The insert may advantageously be made of a material that is different from the material of the rest of the stud. This means that this part, which is subject to very high mechanical stresses, can be made of a harder material. This also makes it possible, in the case of certain embodiments, to produce a molded or injection-molded body to which an insert is attached. Of course, use may also be made of studs formed all in one material. In other words, the first part 60 is not necessarily an insert, i.e. a piece that is separate from the rest of the stud and inserted into it. It can be integral with the stud in the sense that the first part 60 is made of the same material as the rest of stud 30 and is manufactured together with it as one piece.

The other end of the stud 30 is formed by a head 70 which is configured to anchor the stud 30 into the tread 20 of the tire 10.

A body 80 connects the first part 60 and the head 70 of the stud 30. The mean diameter Dc of the body is smaller than the mean diameter Dt of the head 70 of the stud 30, these diameters being measured at right angles to the axis of the stud. The transition between the body of the stud and the head is usually via a part 85 with a diameter that is smaller than the diameters of the head and of the body.

Figure 3:
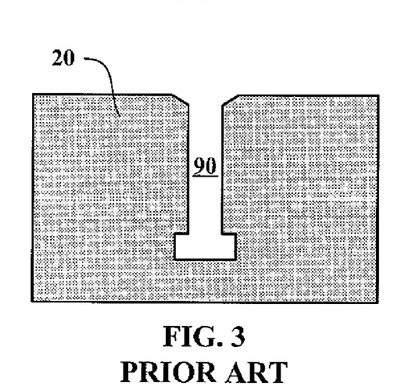
FIG. 3 depicts a stud hole according to the prior art.

FIG. 3 schematically depicts a part of the tread 20 of the tire 10. This tread has a stud hole 90. Each stud hole comprises a cylindrical portion open to the outside of the tread 20 of the tire 10 and is designed to collaborate with a stud 30.

Figure 4:
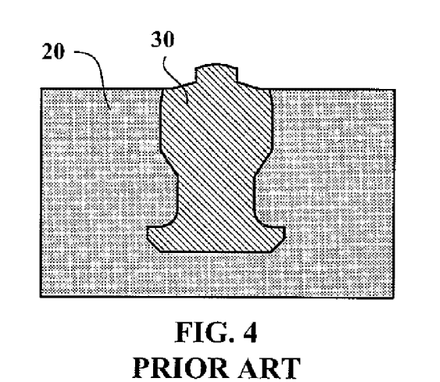
FIG. 4 depicts a stud inserted in a stud hole, according to the prior art.

FIG. 4 schematically depicts the same part of the tread 20 when the stud 30 has been inserted. Thanks to the elasticity of the rubber mix of which the tread is made, the tread 20 perfectly envelops the stud 30 and firmly anchors it into the tire.

Figure 5:
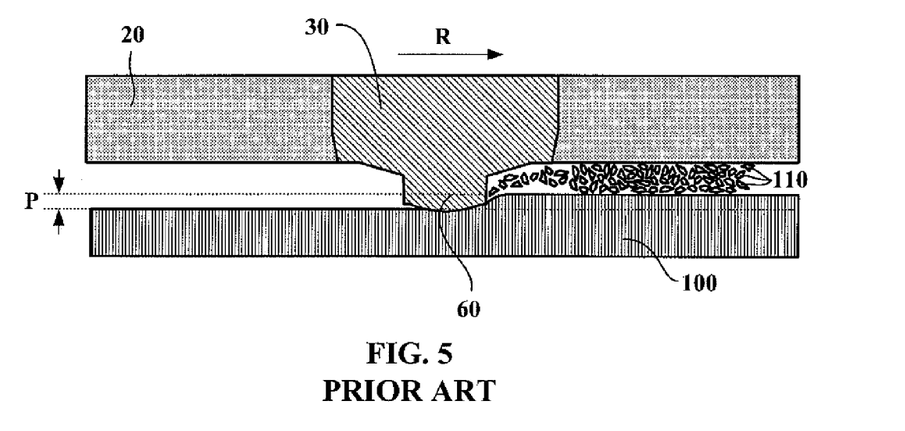
FIG. 5 illustrates how a studded tire according to the prior art works.

FIG. 5 illustrates the way in which a studded tire according to the prior art works. It depicts a part of the stud 30 and of the tread 20 made of rubber mix surrounding this part of the stud. The stud is depicted at the instant that it comes into contact with the ice 100. The direction of rotation R of the tire is indicated with an arrow R. The first part 60 of the stud 30 digs into the ice 100 to a mean depth P. By digging into the ice 100 and scraping it, the stud 30 locally breaks the ice and generates a great many ice splinters 110 which build up at the interface between the tread 20 and the ice 100 and ultimately prevent the first part 60 of the stud 30 from digging any deeper into the ice 100, and this has a negative effect on tire grip.

Figure 6:
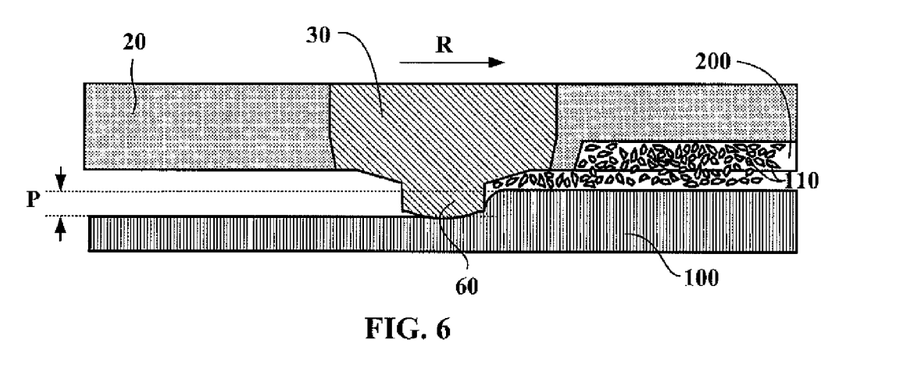
FIG. 6 illustrates how a studded tire according to the invention works.

FIG. 6 illustrates the way in which a studded tire according to the invention works and which allows to reduce this negative effect. This tire comprises a conduit 200 via which the splinters 110 formed as the stud 30 digs into the ice 20 are removed to a groove of the tire. The splinters 110 do not therefore build up between the rolling surface of the tread 20 and the ice 100. Thus, the stud 30 can dig deeper into the ice 100 resulting in a greater mean depth of penetration P and greater grip of the tire on the ice.

Figure 7:
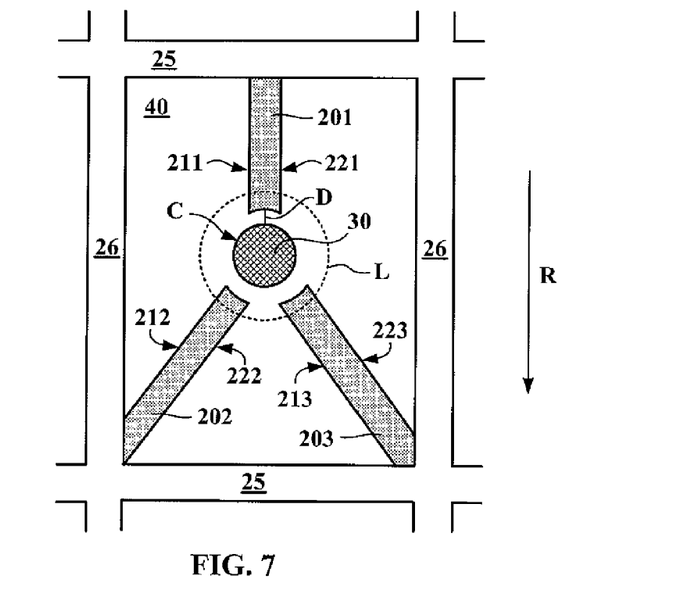
FIGS. 7 and 8 illustrate a number of geometric parameters of a tire according to the invention.
Figure 8:
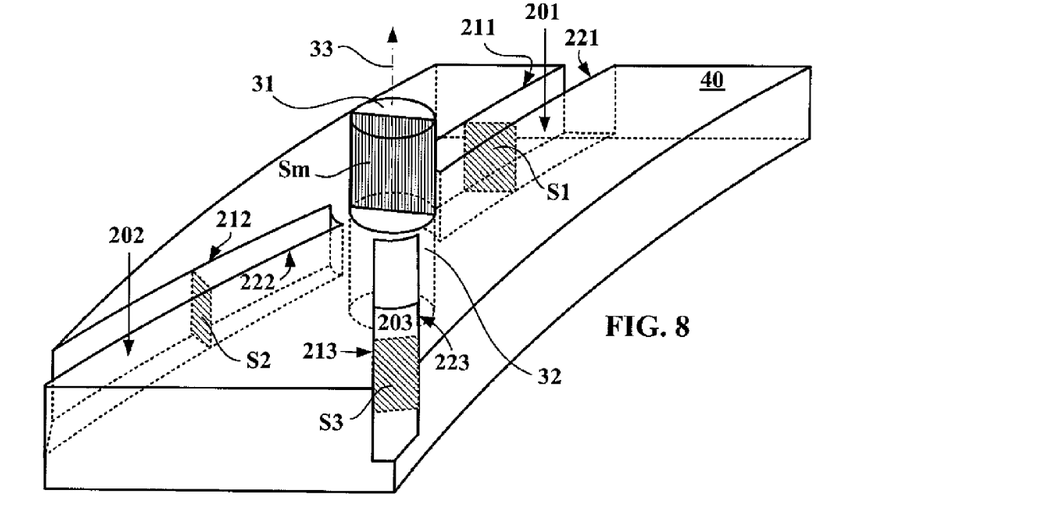

FIGS. 7 and 8 illustrate a number of geometric parameters of a tire according to the invention. These figures schematically depict a tread block 40 of the tire tread 20, viewed from a position radially on the outside of the tread (FIG. 7) and viewed in perspective (FIG. 8). As suggested by FIG. 7, this tread block 40 is surrounded by a plurality of other blocks and is separated from these blocks by transverse 25 and circumferential 26 grooves.

The tread block 40 comprises a stud 30 having a longitudinal axis 33 (see FIG. 8), a part 31 of the stud (see FIG. 8) projecting from that portion of the rolling surface that the surface of the tread block 40 forms. The stud is extended towards the inside of the tread by a part 32 (see FIG. 8), just a portion of which is suggested by the dotted line. The intersection between the stud 30 and the plane tangential to the portion of the rolling surface around the stud forms a contour C. In the case of the stud depicted, this contour C is a circle.

As shown by FIG. 8, that part 31 of the stud that projects from the rolling surface has a minimum cross section Sm. Sm corresponds to the smallest cross section of the part 31 in any plane containing the radial direction that passes through the point of intersection between the longitudinal axis 33 of the stud and the plane tangential to the portion of the rolling surface around the stud. Because the stud is directed radially in the tread, the radial direction that passes through the point of intersection between the longitudinal axis of the stud and the plane tangential to the portion of the rolling surface around the stud coincides with the direction of the longitudinal axis of the stud, and the cross section of the part 31 is the same in all planes containing the radial direction that passes through the point of intersection between the longitudinal axis 33 of the stud and the plane tangential to the portion of the rolling surface around the stud. Sm provides a measure of the smallest possible surface that part 31 of the stud presents to the ice, regardless of the direction of relative movement of the tire with respect to the ice (e.g. during acceleration, braking or uncontrolled sliding). The cross sections are the same if the part 31 is cylindrical. However, this is not so if its shape, for example, is rectangular.

The tread block 40 further comprises three conduits 201 to 203 each forming, on the rolling surface of the tire, two opposing edges 211-213 and 221-223. Each conduit 201 to 203 opens into at least one groove 25 or 26. In this particular instance, the conduits do not connect the contour C to the grooves but end a certain distance D (marked in the case of the conduit 201) away from the contour C. The distance D is shorter than 1 cm. The limit of 1 cm is depicted in FIG. 7 by the circle L (dotted line).

The mean cross sections S1, S2, S3 of the conduits 201 to 203 are measured at right angles to the edges 211-213 and 221-223 formed by the corresponding conduit. In this simple example, the edges are straight and parallel, which means that it does not matter from which edge the cross section of the conduit is measured. If, as may be the case for complex geometries, the mean cross section of a conduit measured at right angles to the first edge is not the same as the mean cross section of the conduit measured at right angles to the second edge, then the mean width will be taken to be the average of the two values obtained at right angles to the two edges.

The sum of the mean cross sections of the conduits 201-203 is greater than or equal to half the minimum cross section Sm of that part 31 of the stud that projects from the tread block 40 of the tread: S1+S2+S3≥Sm/2. In this particular instance, the conduits have been sized such that S1+S2+S3>Sm.

It should be noted that the conduit 202 differs from the conduits 201 and 203 in that the cross section of the conduit is not constant over the entire length thereof but has its minimum near the contour C and increases towards the region where it opens into the groove 26.

FIGS. 9 to 33 depict perspective views of tread blocks of tires according to the invention. For the sake of clarity, the studs have not been depicted; only the conduits 200 and the stud holes 90 designed to receive a stud have been depicted. The direction of rotation of the tire is sometimes indicated using an arrow R.

Figure 9:
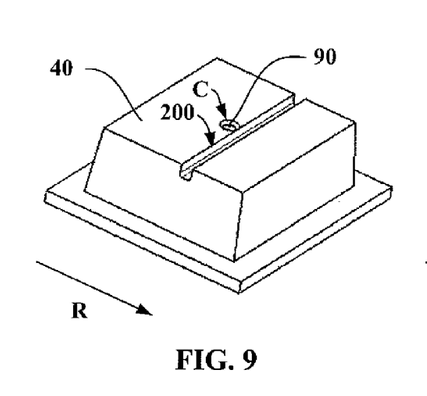
FIGS. 9 to 36 depict tread blocks of tires according to the invention.

FIG. 9 depicts a very simple variant with a conduit of square cross section (2×2 mm²) positioned transversely. As indicated by the arrow R, this conduit is positioned in such a way that it comes into contact with the ground before the stud that is inserted in the stud hole. This arrangement allows for clean starts on icy ground. The ice splinters generated by the action of the stud are removed transversely. It will be noted that the conduit connects the contour C of the stud (which coincides with the contour of the stud hole) to two grooves delimiting the tread block 40.

Figure 10:
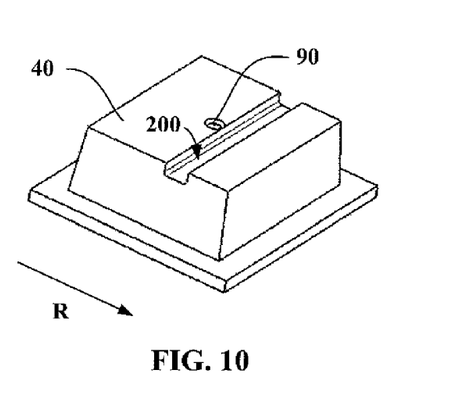
Figure 11:
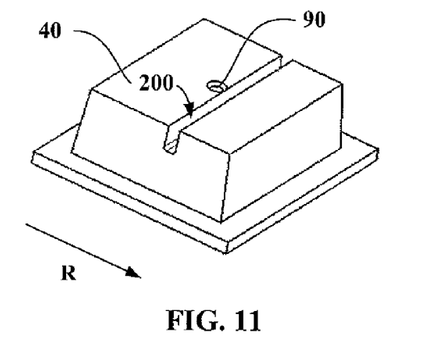

FIGS. 10 and 11 depict similar variants with wider (cross section: 4×2 mm²) or deeper (cross section: 2×4 mm²) conduits.

Figure 12:
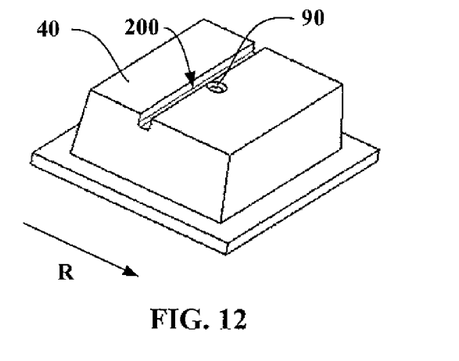

FIG. 12 depicts a variant very similar to that of FIG. 9 but in which the conduit 200 is positioned in such a way that its edges come into contact with the ground after the stud inserted in the stud hole when the tire is rolling in the direction of rolling indicated by the arrow R. This arrangement allows to improve the grip of the tire on ice under braking.

Figure 13:
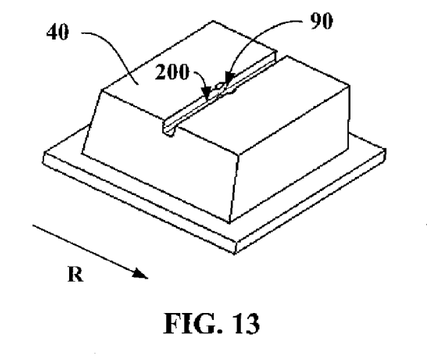

FIG. 13 depicts an advantageous compromise between the tread block 40 of FIG. 9 (advantageous when a driving torque is applied to the tire) and that of FIG. 12 (advantageous when a braking torque is applied to the tire): the conduit 200 is positioned in such a way that its edges come into contact with the ground at practically the same time as the stud inserted in the stud hole, thus allowing good removal of ice splinters both on acceleration and under braking.

In the variants of FIGS. 9 to 13, the conduit connects the contour C of the stud (marked in FIG. 9 only) to two grooves delimiting the tread block 40. This feature has the advantage of making quick removal of ice splinters generated in close proximity to the stud easier but has the disadvantage of slightly reducing the anchorage of the stud in the tread. If the risk of studs being pulled out is to be reduced as far as possible then it is advantageous to offset the conduit or conduits from the contour of the stud. Of course, care has to be taken to ensure that the conduit or conduits is or are not too far removed from the contour C of the stud because that would significantly reduce the effectiveness with which the splinters are removed and therefore the grip of the tire on ice. It has been found that good removal can be achieved with distances of up to 1 cm.

Figure 14:
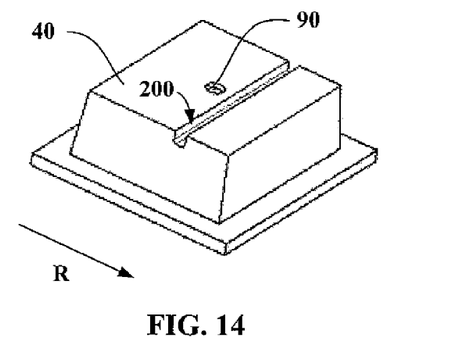

FIG. 14 depicts a variant of a tread block 40 of a tire according to the invention, in which the conduit 200 is positioned in such a way that the edge of the conduit 200 closest to the stud hole 90 is at a non-zero minimum distance from the contour of the stud hole (and therefore from the contour of the stud). As already stated above, this variant has the advantage of allowing excellent stud anchorage.

Figure 15:
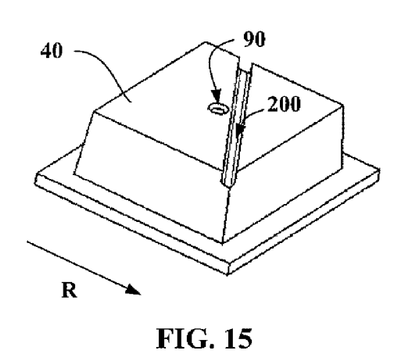
Figure 16:
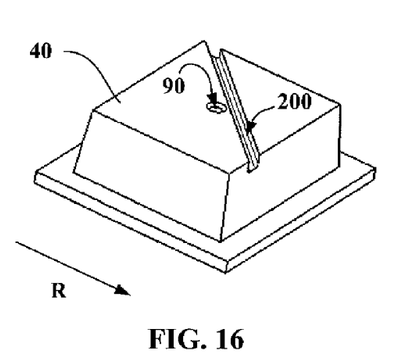
Figure 17:
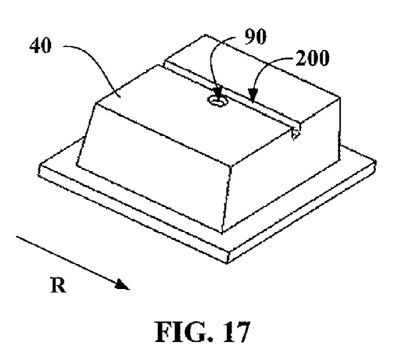

FIGS. 9 to 14 depict tread blocks 40 with a transverse conduit 200. It is possible to provide one or more substantially straight conduits whose direction of alignment is inclined with respect to the transverse direction. Corresponding variants are depicted in FIGS. 15 to 17. The advantage of arranging the conduit in this way is that transverse grip of the tire on ice (for a rolling direction corresponding to the arrow R) is improved.

FIG. 17 depicts an extreme variant in which a straight conduit 200 is circumferentially aligned.

Although FIGS. 15 to 17 all show conduits 200 connecting the contour of the stud hole (and therefore of the stud) to grooves of the tire, it is possible to combine the inclining of the conduit with the offsetting of the conduit or conduits 200 from the contour of the stud.

Figure 18:
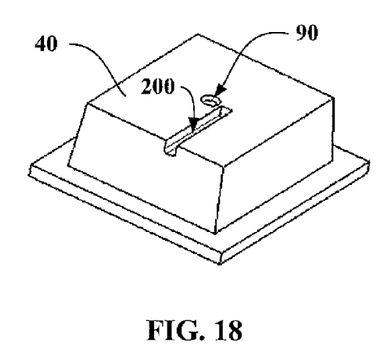

The conduit 200 does not necessarily connect two grooves as in the case of the conduits depicted in FIGS. 9 to 17. FIG. 18 depicts a variant in which the conduit 200 extends from the contour of the stud hole 90 (and therefore of the stud) to one single groove delimiting the tread block 40. This variant has the advantage that the amount of rubber mix enveloping the stud is greater, allowing the stud to be firmly anchored.

Figure 19:
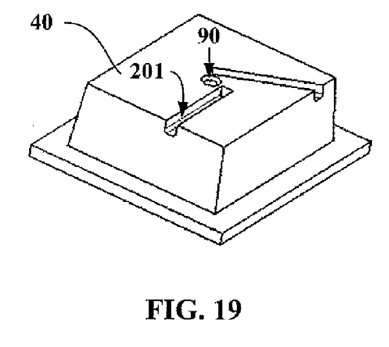
Figure 20:
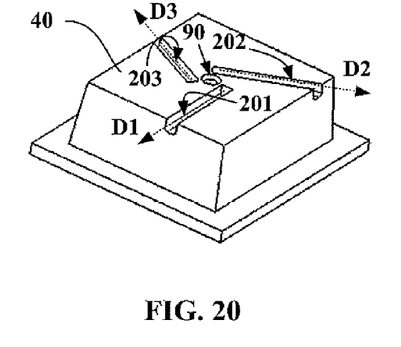
Figure 21:
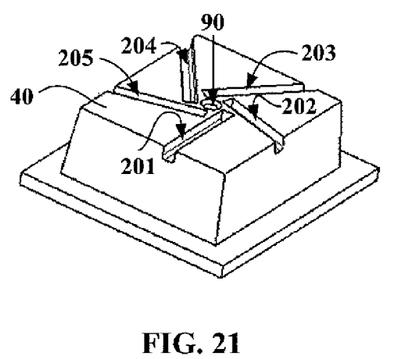

FIGS. 19 to 21 depict variants in which a greater number of conduits is provided: two conduits 201 and 202 (FIG. 19), three conduits 201 to 203 (FIG. 20) or even five conduits 201-205 (FIG. 21). Each of these variants comprises several conduits of which the directions of greatest length along the rolling surface are not parallel. These directions of greatest length D1 to D3 are indicated in respect of the variant depicted in FIG. 20. The variants of FIGS. 20 and 21 differ in that the grip of the tire is excellent in all directions. The direction of rolling R has not been marked in FIGS. 19 to 21 because, on account of their multi-directional geometry, these tread blocks 40 can be positioned on the tread in a great many ways.

The variants depicted in FIGS. 7 to 21 all comprise straight-edged conduits. This does not mean, however, that this is an essential feature of the invention: it is entirely possible, and even perhaps advantageous, to have conduits with curved edges. Such variants are depicted in FIGS. 22 to 25.

Figure 22:
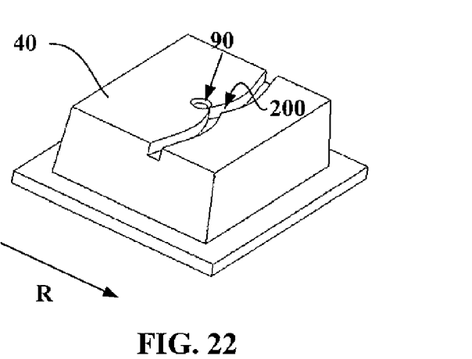

FIG. 22 depicts a variant similar to that of FIG. 9, in which the straight edges have been replaced by doubly curved edges.

Figure 23:
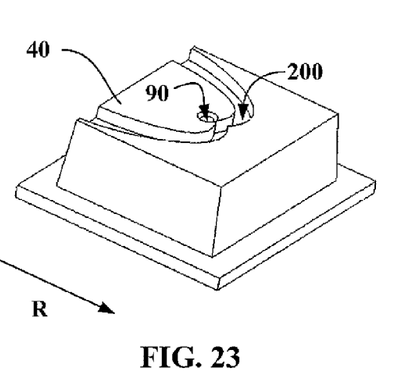

FIG. 23 depicts another variant whereby this curvature is far more pronounced. This variant allows good grip in both circumferential and transverse directions.

Figure 24:
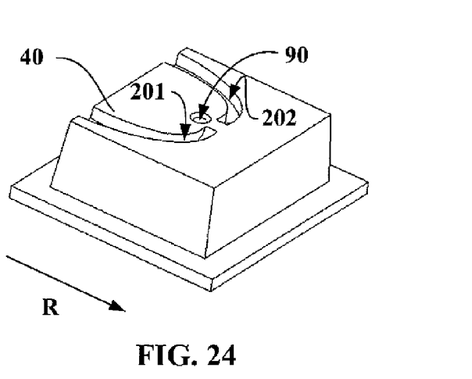

FIG. 24 depicts a variant similar to that of FIG. 23, in which the single conduit has been replaced by two conduits 201 and 202 that have curved edges. This variant has the advantage of providing better anchorage for the stud.

Figure 25:
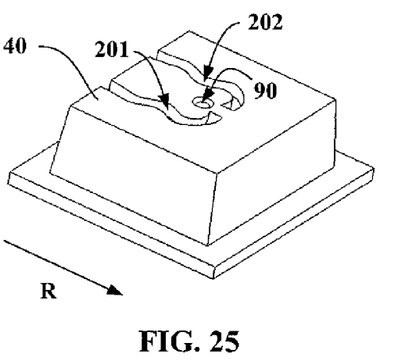

FIG. 25 depicts another variant with two conduits 201 and 202 that have curved edges. Those skilled in the art will understand that it is possible to adapt the compromise between transverse and circumferential grip by suitably altering the specific geometry of the conduit (or of the conduits if there is more than one of these).

Figure 26:
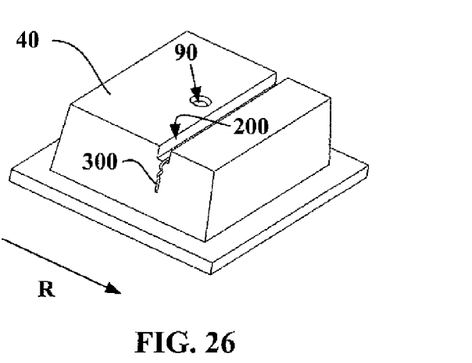

It may be advantageous to combine all these conduits with a sipe 300 which extends the conduit radially inwards, as depicted in FIG. 26. Thus, when wear has worn away the conduit in the tread block 40, there remains a sipe which performs its function known per se.

It is also possible to provide conduits which appear only gradually as the tire becomes worn. This is the case of the variant depicted in FIG. 27. The tread block 40 depicted comprises, at the rolling surface, when new (that is to say prior to any wear caused by rolling along), a conduit 200 which extends from the stud hole 90 towards one of the grooves delimiting the tread block 40. This conduit is extended by a sipe 310 which also opens into one of the grooves that delimit the tread block 40. This sipe 310 is extended radially inwards by a channel 400. This channel is formed in such a way that when the conduit 200 disappears as a result of tread wear, this channel 400 opens onto the rolling surface and in turn forms a conduit that will allow ice splinters to be removed. The channel may be molded using molding equipment known to those skilled in the art and described, for example, in documents U.S. Pat. Nos. 5,964,118 and 6,408,910.

Figure 28:
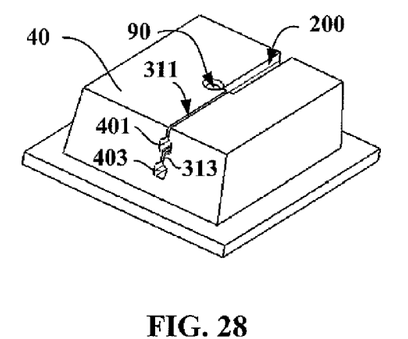
Figure 29:
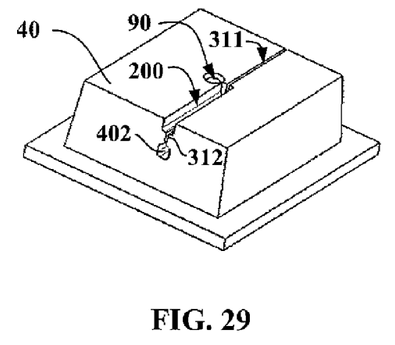

FIGS. 28 and 29 depict a more complex variant, employing the same principle, and viewed from two different viewpoints. The tread block 40 depicted comprises, at the rolling surface, when new (that is to say before any wear due to rolling along), a conduit 200 which extends from the stud hole 90 towards one of the grooves delimiting the tread block 40. This conduit is extended by a sipe 311 which also opens into one of the grooves delimiting the tread block 40. As shown in the viewpoint depicted in FIG. 7, this sipe 311 is extended radially inwards by two channels 401 and 403 separated by a sipe 313. As shown in the viewpoint depicted in FIG. 8, the conduit itself is extended radially inwards by a sipe 312 which opens onto a channel 402. The sipes 311-312 and the channels 401-403 are dimensioned such that when the conduit 200 disappears through tread wear, the channel 401 opens onto the rolling surface and in turn forms a conduit allowing ice splinters to be removed. As wear progresses, the channel 402 takes over and finally the channel 403 forms a conduit when the conduit formed by the channel 402 has disappeared.

Figure 30:
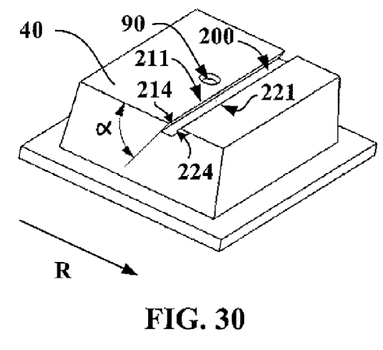

The conduits in the variants depicted in the figures are all of substantially rectangular cross section, but this is not an essential feature of the invention. It is possible to imagine rounded or even hemispherical cross sections. According to another variant, the conduits may have a triangular or parallelepipedal cross section. FIG. 30 shows a conduit 200 of parallelepipedal cross section. The walls 214 and 224 of the conduit 200 which extend the edges 211 and 221 of the conduit 200 radially inwards are inclined by an angle α (alpha) with respect to the rolling surface of the tread block 40 (in this instance, α=70°). Thus, the conduit 200 "scrapes" the ice, thereby improving the removal of ice splinters. Of course, it is possible to conceive of inclining just one of the walls 214 or 224. In this document, any angle relating to a particular direction of a recess corresponds to the smallest angle between the rolling surface and this direction.

Figure 27:
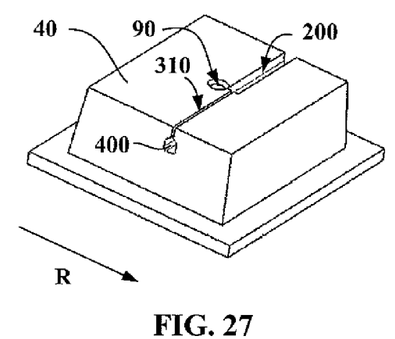
Figure 31:
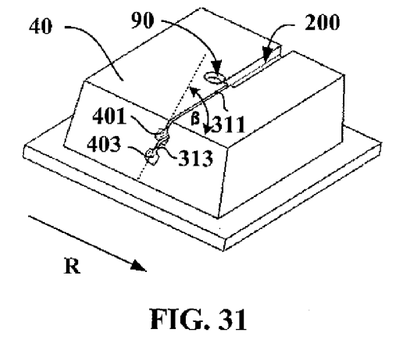

The principle of inclining the conduits may also be applied to "renewable" conduits like those depicted in FIGS. 27 to 29. FIG. 31, which should be compared with FIG. 28, illustrates this option. The sipes 311, 312 (which are not visible in the figure) and 313 are inclined by an angle β (beta) with respect to the rolling surface (in this instance, β=80°).

Figure 32:
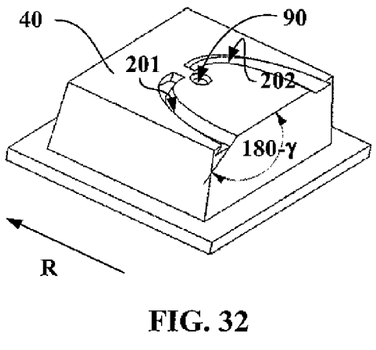

FIG. 32 depicts another complex variant. The tread block 40 comprises two conduits 201 and 202 the edges of which are curved and the cross sections of which are parallelepipedal, with an angle of inclination γ (of which the complementary angle 180°-γ is indicated in the figure) with respect to the rolling surface.

Figure 33:
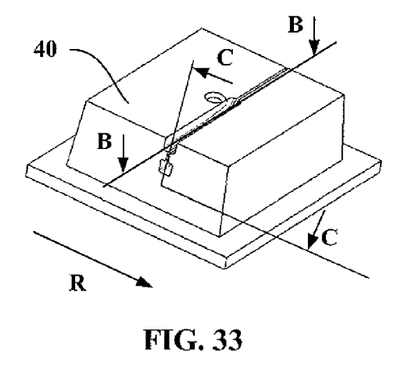
Figure 34:
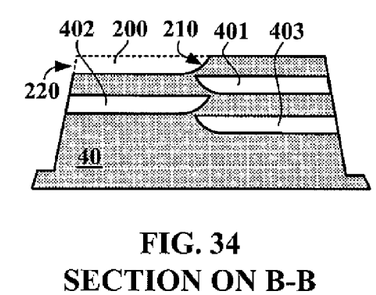

FIGS. 33 to 36 illustrate the internal geometry of a tread block 40 similar to that of FIGS. 28 and 29. FIG. 34 depicts the cross section of the tread block 40 in a section on B-B (see FIG. 33). It shows the conduit 200 and the three channels 401 to 403. The figure clearly illustrates the geometry of the "internal" end 210 of the conduit 200, which is opposite to the "external" end 220 of the conduit 200 via which the conduit opens into the groove delimiting the tread block 40. At this "internal" end 210, the depth of the conduit increases continuously in the manner of a children's slide with a rounded bottom. This geometry is particularly advantageous because it allows good removal of ice splinters while at the same time allowing good stud anchorage. This type of geometry may advantageously be combined with all the variants of conduits according to the invention, one end of which does not open into a groove of the tire tread (such as the variants of FIGS. 18-21, 24-25, 29 and 32, for example). Almost equivalent results are obtained with a conduit whose depth increases continuously, in the manner of a flat-bottomed slide.

Figure 35:
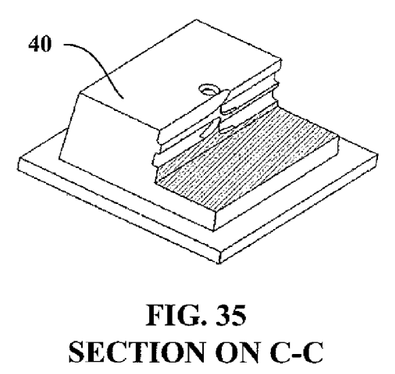

FIGS. 35 depicts the cross section of the tread block 40 in sections on C-C (see FIG. 33).

Figure 36:
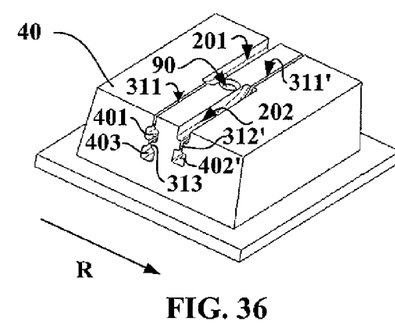

FIG. 36 depicts a last complex variant of a tread block 40 of a tire according to the invention. This tread block has two sets of conduits, sipes and channels. The first set comprises a conduit 201 which extends from the stud hole 90 towards one of the grooves delimiting the tread block 40. This conduit is extended by a sipe 311 which also opens into one of the grooves delimiting the tread block 40. This sipe 311 is extended radially inwards by two channels 401 and 403 separated by a sipe 313. The conduit 201 itself is extended radially inwards by a sipe which opens onto a channel (not visible in the figure). The second set is identical to the first after rotation by 180° about a radial direction passing through the axis of the stud hole 90. It comprises a conduit 202 which extends from the stud hole 90 towards one of the grooves delimiting the tread block 40. This conduit is extended by a sipe 311' which also opens into one of the grooves delimiting the tread block 40. This sipe 311' is extended radially inwards by two channels (neither visible) separated by a sipe (not visible). The conduit 202 itself is extended radially inwards by a sipe 312' which opens onto a channel 402'. This variant of tread block 40 makes it possible for grip to be the same under braking torque as it is under driving torque, while at the same time retaining a very good life in terms of wear.

Figure 37:
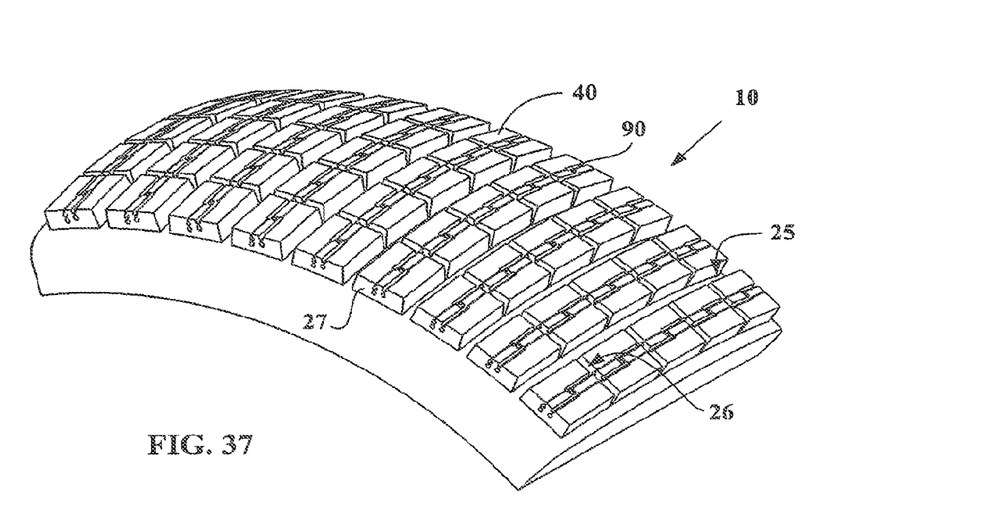
FIGS. 37 and 38 depict a portion of a tire according to the invention, before and after the studs are fitted.

FIG. 37 depicts a tire 10 according to the invention, the tread of which comprises a plurality of tread blocks 40 identical to the tread block depicted in FIG. 36, which are separated by transverse 25 and circumferential 26 grooves. It should be noted that, in this figure, it is possible to see conduits opening onto a lateral face of the tread.

Figure 38:
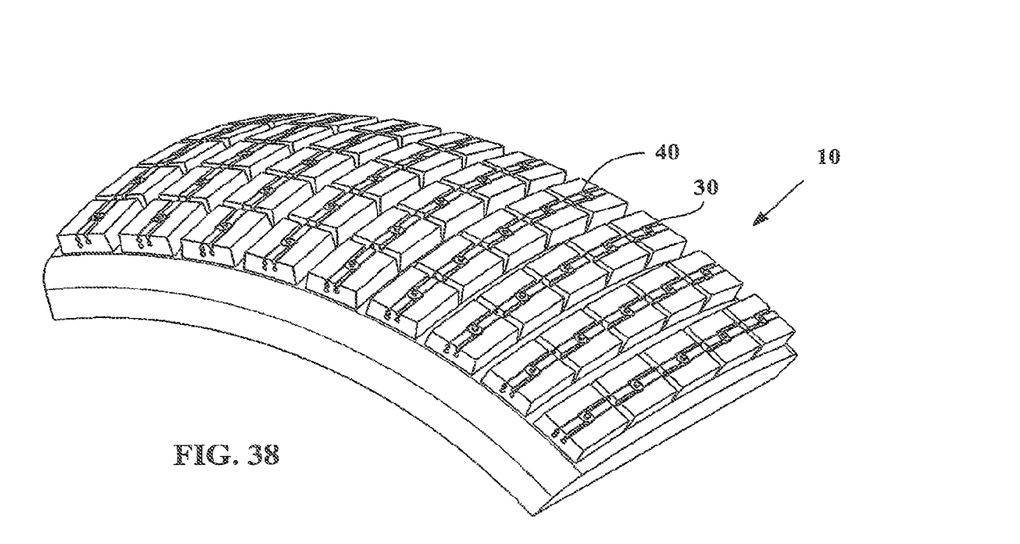

FIG. 38 depicts the same tire 10 according to the invention once the studs 30 have been fitted into the stud holes.

Acceleration tests have demonstrated the improvement in grip of the tires according to the invention. A tire like that of FIG. 38, of the 205/55 R16 size, was compared against a conventional "X-ice North" Michelin tire. The tire according to the invention yielded a significant improvement in acceleration times on ice, in spite of the fact that the tire according to the invention had 6% less groove ratio which in theory should have led to an approximately 7% drop in grip on ice.

The invention claimed is:

1. A tire for driving on ice, comprising:
   a tread having a rolling surface configured to come into contact with the ground when the tire is rolling along, and two lateral faces, the tread comprising at least one groove in the rolling surface;
   at least one stud having a longitudinal axis, a part of the at least one stud projecting from the rolling surface, the intersection between the at least one stud and the plane tangential to the portion of the rolling surface around the at least one stud forming a contour C, that part of the at least one stud that projects from the rolling surface having a minimum cross section Sm, Sm corresponding to the smallest cross section of said part in any plane containing the radial direction that passes through the point of intersection between the longitudinal axis of the at least one stud and the plane tangential to the portion of the rolling surface around the at least one stud; and
   at least one conduit that forms, on the rolling surface of the tire, at least two opposing edges, the minimum distance D between the at least one conduit and the contour C being less than or equal to 1 cm, the at least one conduit opening into the at least one groove and/or onto a lateral face of the tread;
   wherein, for each at least one stud, the sum of the mean cross sections Sn of the at least one conduit associated with that stud, each mean cross section Sn being measured at right angles to one of the opposing edges formed by the at least one conduit, is greater than or equal to half the minimum cross section Sm of that part of the at least one stud that projects from the tread;
   wherein the at least one stud is substantially cylindrical in shape, and
   wherein the tread of the tire comprises a plurality of tread blocks, and wherein the at least one conduit is formed in at least one of the plurality of tread blocks.

2. The tire of claim 1, wherein the at least one conduit connects the at least one contour C to the at least one groove.

3. The tire of claim 1, wherein the edges of the at least one conduit are straight.

4. The tire of claim 1, wherein the edges of the at least one conduit are curved.

5. The tire according to claim 1, wherein the at least one conduit opens into a single groove of the tread.

6. The tire of claim 1, wherein the at least one conduit opens into at least two grooves of the tread.

7. The tire of claim 1, wherein the cross section of the at least one conduit is constant over the entire length of the at least one conduit.

8. The tire of claim 1, wherein the cross section of the at least one conduit can vary, the cross section of the at least one conduit being at its minimum near the at least one stud.

9. The tire of claim 1, wherein the tire has a preferred direction of rolling (R) and the at least one conduit is positioned in such a way that it comes into contact with the ground before the at least one stud with which the at least one conduit is associated when the tire is rolling in its preferred direction of rolling.

10. The tire of claim 1, wherein the tire has a preferred direction of rolling (R) and the at least one conduit is positioned in such a way that it comes into contact with the ground after the at least one stud with which the at least one conduit is associated when the tire is rolling in its preferred direction of rolling.

11. The tire of claim 1,
   wherein each tread block comprises a plurality of conduits.

12. The tire of claim 11, wherein each tread block comprises at least two conduits of which the directions of greatest length along the rolling surface are not parallel.

13. The tire of claim 1,
   wherein the at least one conduit is extended radially inwards by a sipe.

14. The tire of claim 13, wherein the sipe is extended radially inwards by a channel, the channel being dimensioned such that when the tread is worn and the channel opens on to the rolling surface, the channel forms a conduit in the rolling surface.

15. The tire of claim 1, wherein the mean depth of the at least one conduit is less than the mean depth of the at least one groove.

16. The tire of claim 1, wherein the at least one stud comprises:
   a head configured to anchor the at least one stud into the tread of the tire;

an insert configured to come into contact with the ground; and a body, which connects the head and the insert, wherein the mean diameter of the body is smaller than the mean diameter of the head.

* * * * *